United States Patent
Weinerman et al.

(10) Patent No.: US 10,759,327 B1
(45) Date of Patent: Sep. 1, 2020

(54) TIE DOWN APPARATUS

(71) Applicant: The Eastern Company, Cleveland, OH (US)

(72) Inventors: Lee S. Weinerman, Medina, OH (US); Frederick L. Putzier, Columbia Station, OH (US); Marinel Rosu, Strongsville, OH (US)

(73) Assignee: The Eastern Company, Cleveland, OH (US)

( * ) Notice: Subject to any disclaimer, the term of this patent is extended or adjusted under 35 U.S.C. 154(b) by 124 days.

(21) Appl. No.: 16/183,914

(22) Filed: Nov. 8, 2018

Related U.S. Application Data

(60) Provisional application No. 62/586,306, filed on Nov. 15, 2017.

(51) Int. Cl.
*B60P 7/08* (2006.01)
*B60Q 1/00* (2006.01)

(52) U.S. Cl.
CPC .......... *B60P 7/0807* (2013.01); *B60Q 1/0017* (2013.01); *B60Q 1/0023* (2013.01); *B60Q 2400/00* (2013.01); *B60Q 2400/20* (2013.01)

(58) Field of Classification Search
CPC ... B60P 7/0807; B60Q 1/0017; B60Q 1/0023; B60Q 2400/00; B60Q 2400/20
USPC ................. 410/101, 102, 106, 107, 111, 112
See application file for complete search history.

(56) References Cited

U.S. PATENT DOCUMENTS

| | | | |
|---|---|---|---|
| 3,888,190 A * | 6/1975 | Bigge | B60P 7/0807 410/101 |
| 4,907,921 A | 3/1990 | Akright | |
| D307,107 S | 4/1990 | Wensien | |
| D314,133 S | 1/1991 | Issard | |
| 5,052,869 A * | 10/1991 | Hansen, II | B60P 7/0807 410/101 |
| 5,180,263 A | 1/1993 | Flowers, Jr. | |
| 5,216,972 A * | 6/1993 | Dufrene | B63B 21/045 114/218 |
| 5,774,948 A | 7/1998 | Petschke et al. | |
| 6,030,159 A | 2/2000 | Herrick et al. | |
| 6,138,975 A | 10/2000 | McDaid | |
| 6,918,721 B2 | 7/2005 | Venton-Walters et al. | |
| 6,968,796 B1 * | 11/2005 | Burke | B63B 21/045 114/218 |
| 7,134,819 B2 * | 11/2006 | Bullock | B60P 7/0807 410/102 |

(Continued)

FOREIGN PATENT DOCUMENTS

| | | | | |
|---|---|---|---|---|
| DE | 4235568 A1 * | 4/1994 | ............ | B60Q 9/001 |
| DE | 202014007564 U1 * | 1/2016 | ............ | E05B 17/10 |

(Continued)

*Primary Examiner* — Hilary L Gutman
(74) *Attorney, Agent, or Firm* — Ralph E. Jocke; Walker & Jocke

(57) ABSTRACT

A tie down (10, 116, 122, 128) is used for connecting a connecting member (58) such as a rope, cord, chain, wire or hook into operative connection with a supporting structure such as a wall (66). The tie down includes an annular base (16) and a centerpiece (32). An eye (36) is movably mounted in connection with the centerpiece to facilitate the engagement of the eye with a connecting member. A light ring (28, 128) includes at least one light (30). The at least one light is selectively operative to surroundingly illuminate the centerpiece and the eye.

28 Claims, 11 Drawing Sheets

(56) References Cited

U.S. PATENT DOCUMENTS

| | | | |
|---|---|---|---|
| D549,556 S | 8/2007 | Christie | |
| D565,935 S | 4/2008 | Selby | |
| 7,398,664 B1 | 7/2008 | Weinerman et al. | |
| D587,835 S * | 3/2009 | Hanson | D26/72 |
| D619,954 S | 7/2010 | Le | |
| 8,025,431 B1 * | 9/2011 | Burke | B63B 21/045 |
| | | | 114/218 |
| 8,075,232 B2 * | 12/2011 | Le | B61D 45/001 |
| | | | 410/106 |
| 9,056,659 B2 * | 6/2015 | Adair | B63B 45/00 |
| 9,919,768 B1 * | 3/2018 | Brookins | B63B 21/00 |
| 10,480,746 B2 * | 11/2019 | Norris | F21S 43/255 |
| 2004/0008508 A1 * | 1/2004 | Alvarez | E05B 17/10 |
| | | | 362/100 |
| 2004/0062047 A1 * | 4/2004 | Camarota | A47K 3/003 |
| | | | 362/399 |
| 2006/0139941 A1 * | 6/2006 | Lin | B60Q 1/0052 |
| | | | 362/509 |
| 2009/0122522 A1 * | 5/2009 | Yang | E05B 17/10 |
| | | | 362/100 |
| 2011/0117959 A1 * | 5/2011 | Rolston | A45D 40/18 |
| | | | 455/556.1 |
| 2012/0017817 A1 * | 1/2012 | Martzall | B63B 21/045 |
| | | | 114/218 |
| 2012/0314438 A1 * | 12/2012 | Gutt | B60Q 3/267 |
| | | | 362/511 |
| 2013/0051046 A1 * | 2/2013 | Yeh | F21S 43/26 |
| | | | 362/487 |
| 2013/0242531 A1 * | 9/2013 | Urayama | H01H 19/025 |
| | | | 362/23.22 |
| 2013/0270251 A1 * | 10/2013 | Furuti | H05B 3/68 |
| | | | 219/445.1 |
| 2014/0056022 A1 * | 2/2014 | Caroli | G05G 1/10 |
| | | | 362/551 |
| 2017/0203686 A1 * | 7/2017 | Salter | G09F 13/08 |
| 2019/0249862 A1 * | 8/2019 | Fan | F21V 17/12 |
| 2019/0299880 A1 * | 10/2019 | Caruso | B60Q 1/0023 |

FOREIGN PATENT DOCUMENTS

| | | | | |
|---|---|---|---|---|
| JP | 2004231052 A | * | 8/2004 | |
| WO | WO-2010092412 A1 | * | 8/2010 | G02B 21/084 |

* cited by examiner

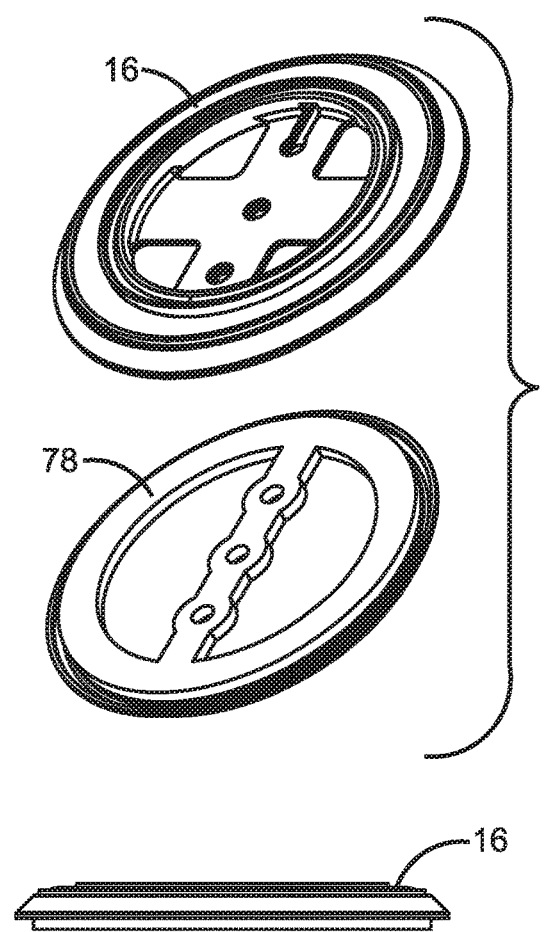
FIG. 8
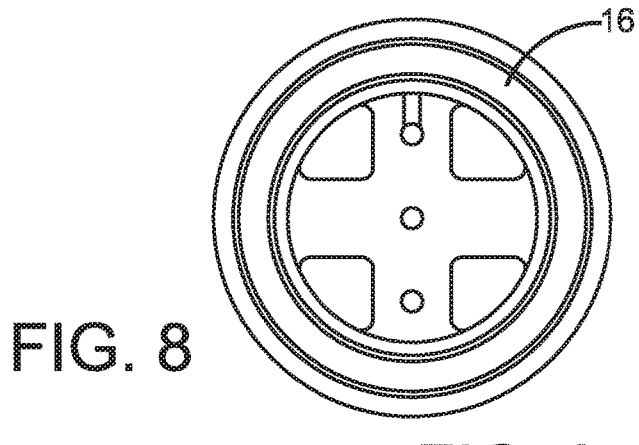
FIG. 9
FIG. 10
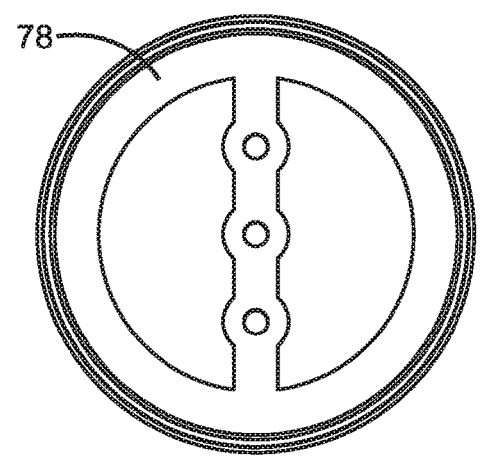
FIG. 11
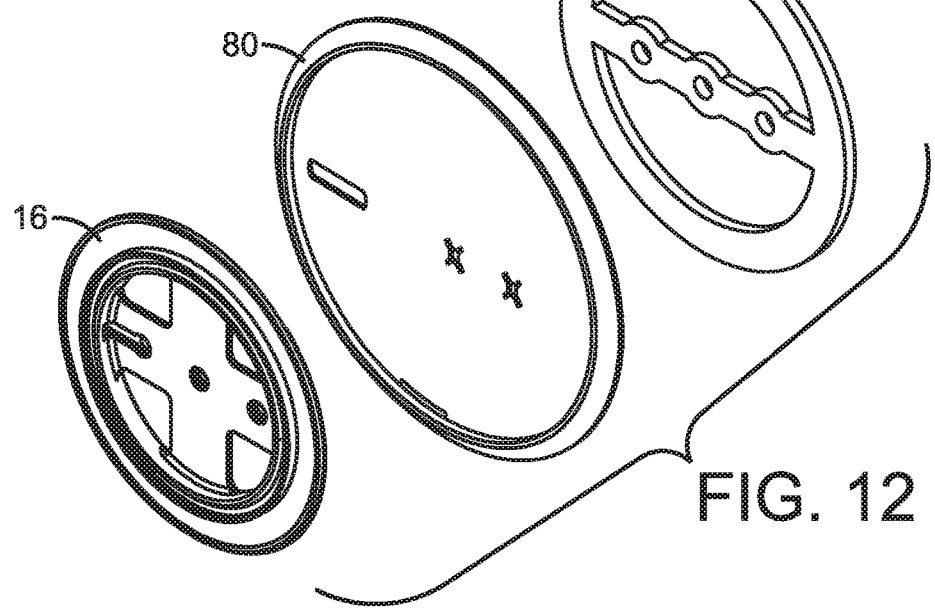
FIG. 12

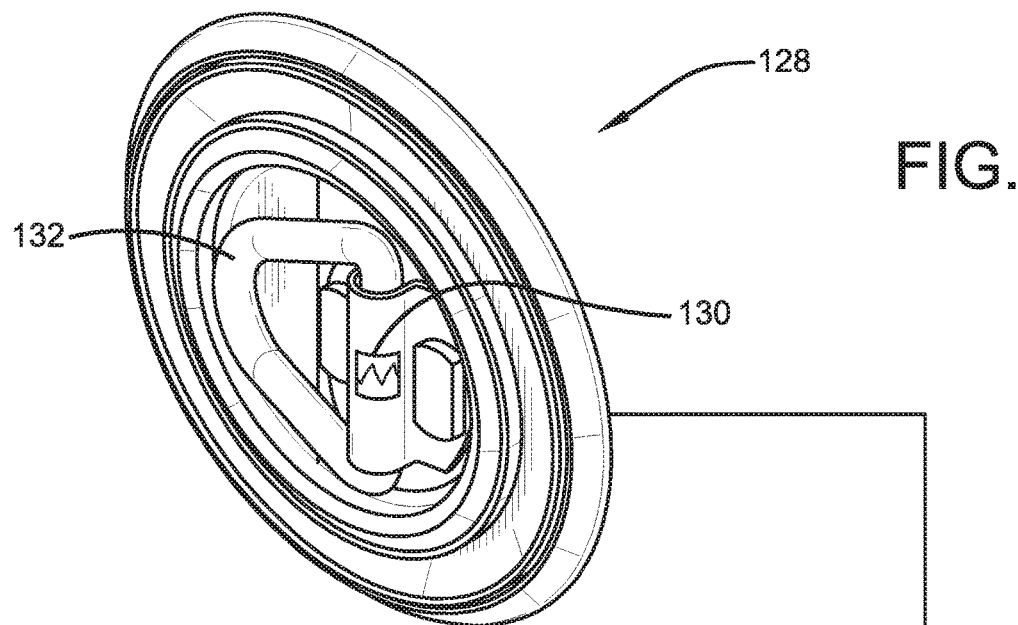
FIG. 18
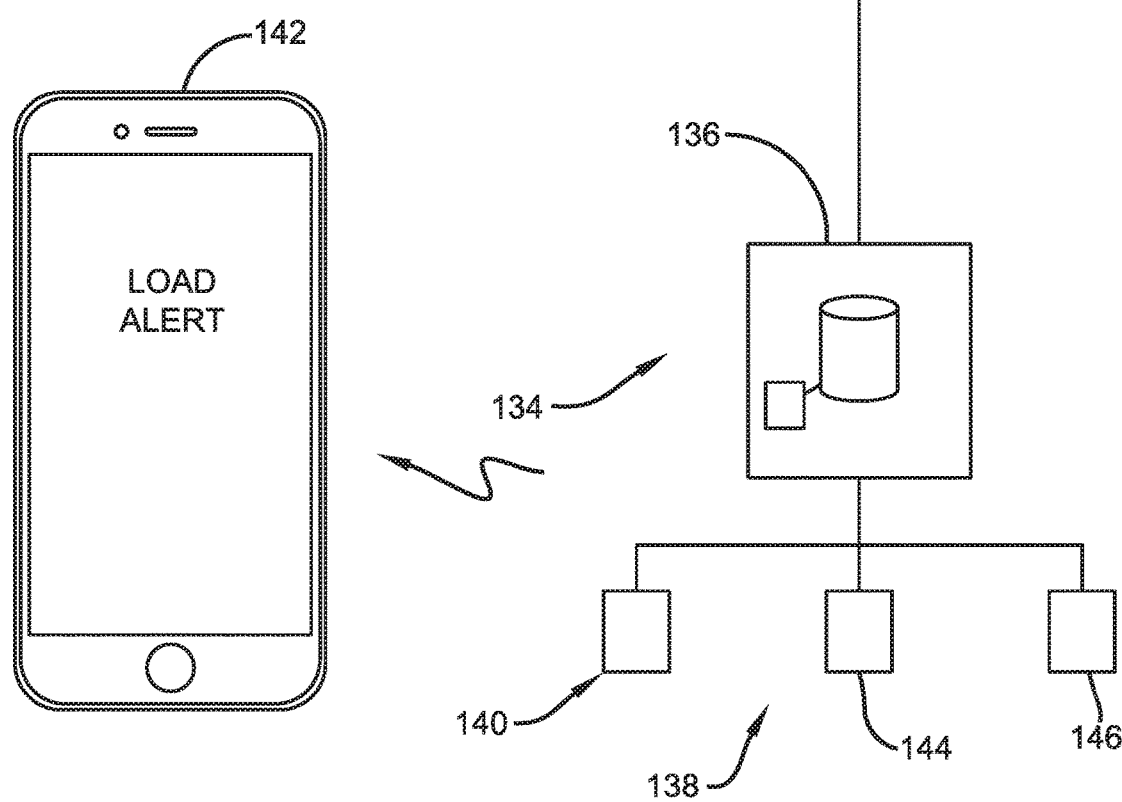

US 10,759,327 B1

TIE DOWN APPARATUS

TECHNICAL FIELD

Exemplary embodiments relate to a tie down apparatus that is utilized to connect and hold a connecting member such as a cord, rope, hook or wire in operative connection with a base structure such as a wall.

BACKGROUND

Tie downs are utilized to hold items in connected relation. Tie downs may be used for example, to engage a connecting member such as a rope and an item that is desired to be held generally immobile in a fixed position. Tie downs may be used for example to hold a load in a fixed position relative to a load supporting structure such as the cargo bed of a vehicle. Tie downs may also be used for holding connecting members that are attached to covers or tarpaulins that are used to cover items to be protected from the elements. Tie downs may also be used with different types of connecting members. For example, tie downs may be used to engage ropes, wires, chains, hooks or other types of connecting members that are to be held in connection with the structure to which the tie down is connected.

Tie down apparatus may benefit from improvements.

SUMMARY OF DISCLOSURE

Exemplary embodiments described herein include a tie down apparatus which can be used to operatively connect a connecting member and a support structure such as a wall. The exemplary arrangement provides a firm connection through the tie down to the support structure.

Exemplary embodiments provide a tie down that includes an eye that can be selectively transversely extended for engaging a connecting member when in use, and retracted to be parallel to a centerpiece and/or into a recess in the tie down when not in use. Exemplary embodiments further include a tie down with a light ring that enables illuminating the area of the tie down to facilitate being able to engage the eye with a connecting member in low light conditions. Exemplary embodiments further include the capabilities for selectively adjusting the color and/or the light intensity output from the tie down.

Other exemplary embodiments provide for sensing conditions that may indicate a problem with a connecting member and/or the tie down. In some exemplary arrangements the tie down is operative to detect a change in the tension force applied to the eye of the tie down which may indicate that a connecting member has become disengaged or another undesirable condition has occurred. An indication may be provided to an operator of the change in tension force so that any problem may be identified and corrected. Alternative arrangements may provide outputs indicative of a level of tension force applied to the tie down through color outputs from the light ring and/or wireless output signals.

Exemplary embodiments include numerous other features and capabilities.

BRIEF DESCRIPTION OF DRAWINGS

FIG. 8 is a perspective exploded view of a base of an exemplary embodiment.

FIG. 9 is a top view of the base shown in FIG. 8.

FIG. 10 is a side view of the base shown in FIG. 8.

FIG. 11 is a top view of the lower plate portion of the base shown in FIG. 8.

FIG. 12 is an exploded perspective view of an alternative base arrangement.

FIG. 18 shows an exemplary circuit associated with a tie down for detecting and indicating changes in tension force acting on the tie down.

DETAILED DESCRIPTION

Figure 1:
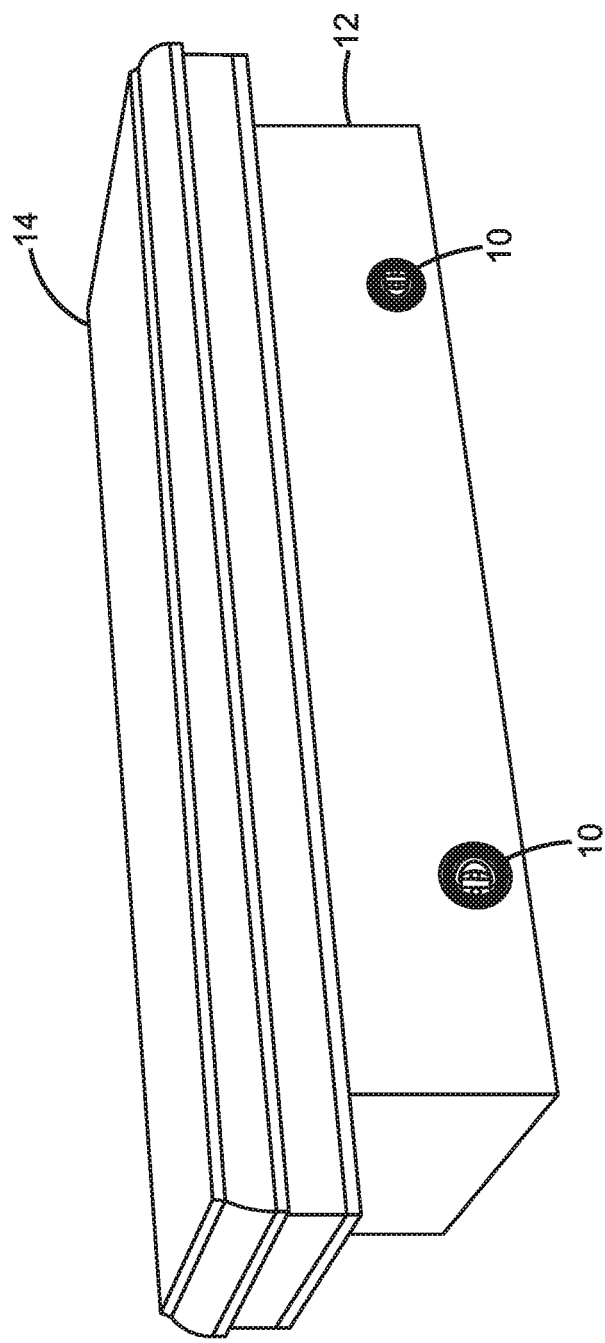
FIG. 1 is a perspective view of a toolbox structure including a tie down apparatus of an exemplary embodiment.
Figure 2:
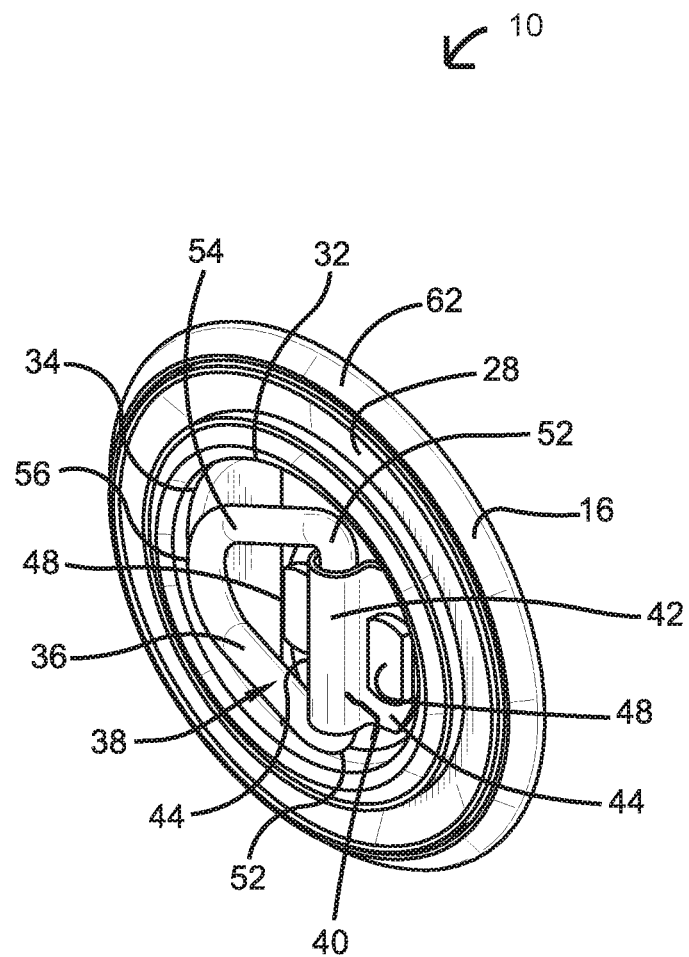
FIG. 2 is a perspective view of an exemplary tie down.

Referring now to the drawings and particularly to FIG. 1, there is shown therein two exemplary tie down apparatus 10. Each of the tie downs is shown in attached connection with a supporting structure 12. In the arrangement shown the supporting structure 12 includes a wall of a toolbox 14. The exemplary toolbox 14 is a type that may be installed in the bed of a pickup truck or similar vehicle. Of course it should be understood that this is just one exemplary type of use for the tie downs described herein. In this description the terms tie down and tie down apparatus are used interchangeably.

Figure 3:
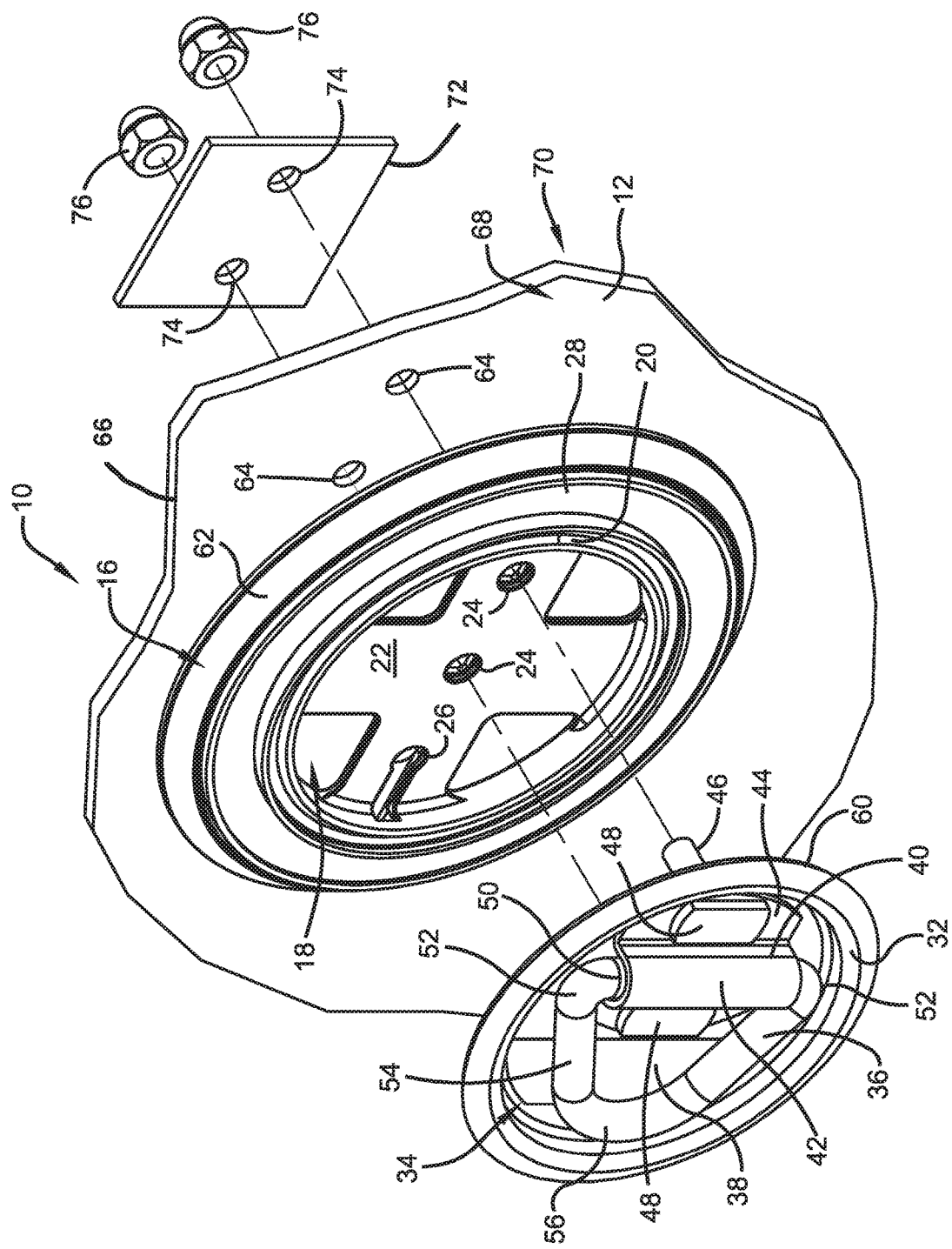
FIG. 3 is a perspective exploded view of an exemplary tie down.
Figure 4:
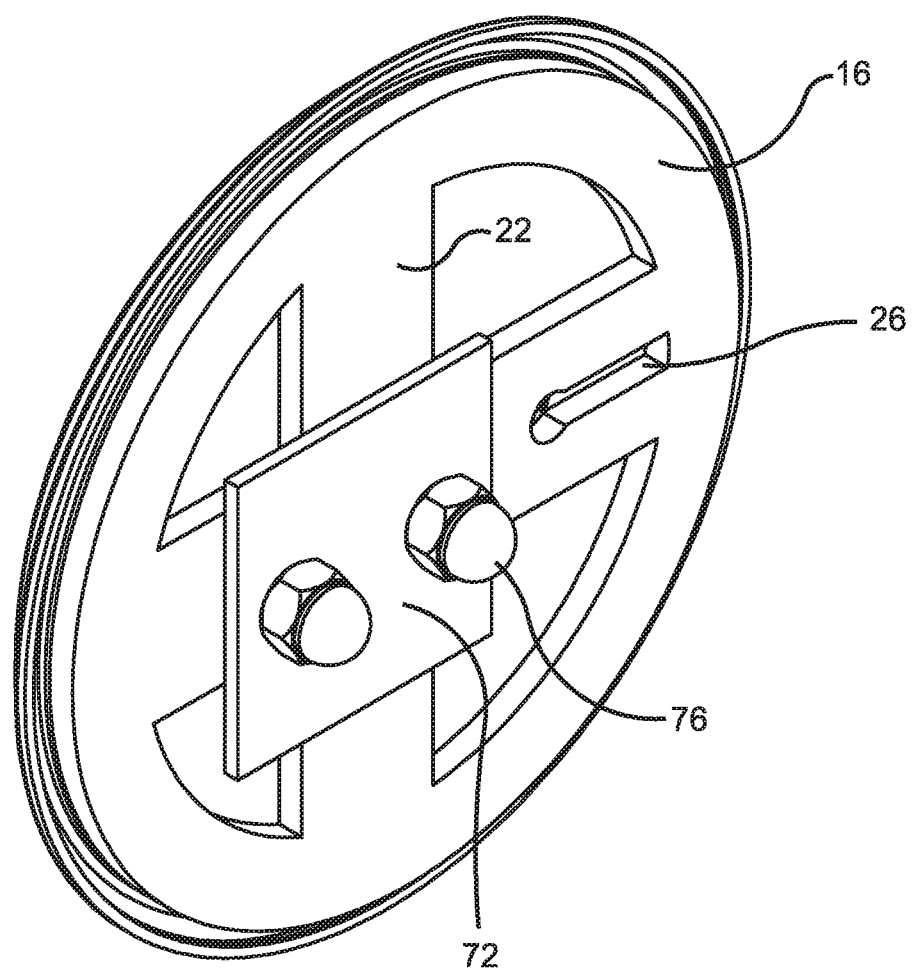
FIG. 4 is a back perspective view of an exemplary tie down and backing plate.
Figure 6:
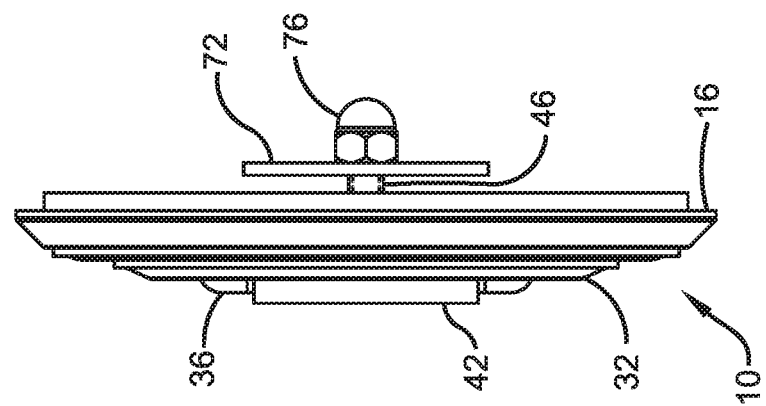
FIG. 6 is a right side view of the exemplary tie down.
Figure 5:
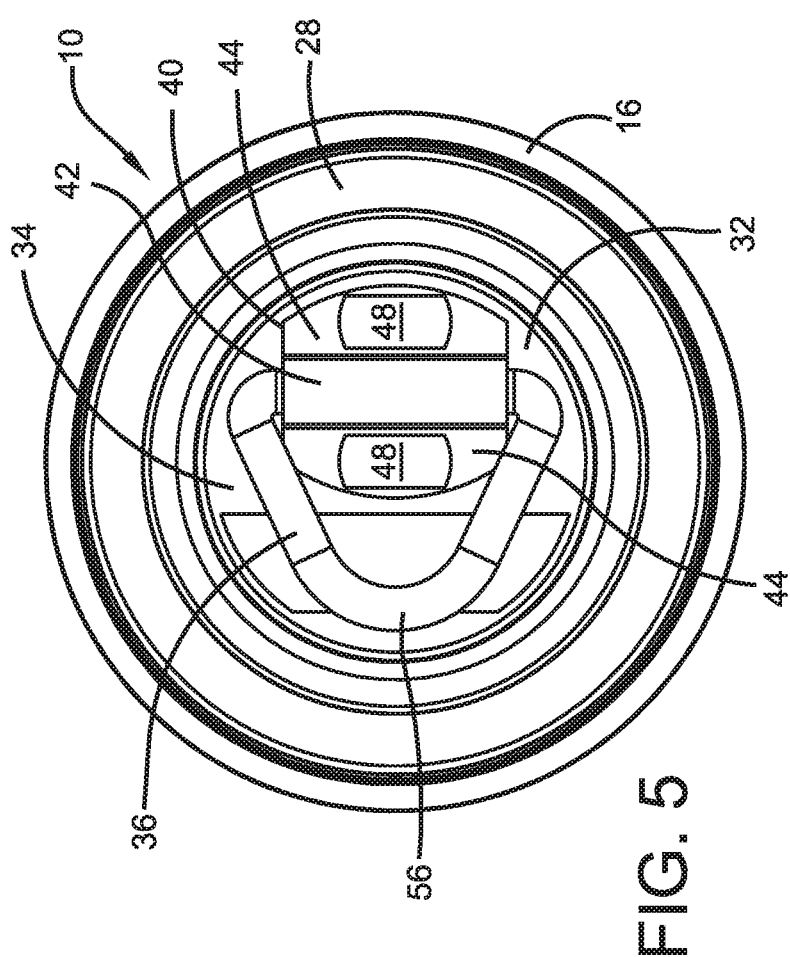
FIG. 5 is a front view of the exemplary tie down.
Figure 7:
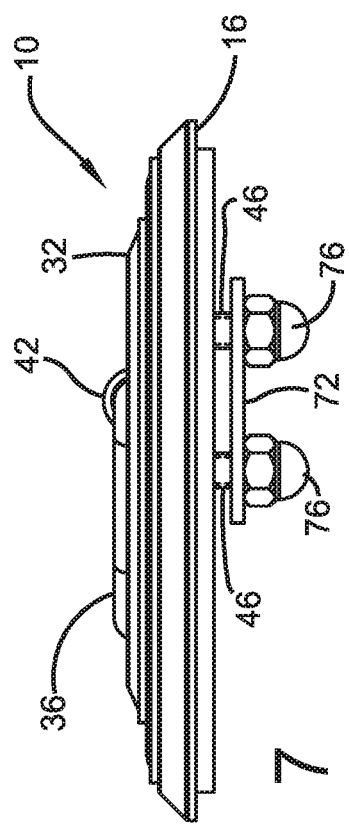
FIG. 7 is a bottom side view of the exemplary tie down.

FIGS. 2 through 7 show the exemplary tie down 10 in further detail. The tie down includes an annular base 16. Annular base 16 includes a centered substantially circular base opening 18 as shown in FIG. 3. The exemplary base 18 further includes an annular base recess 20. The annular base recess surrounds the substantially circular base opening 18 in the exemplary embodiment. A web portion 22 extends in the base opening 18. The exemplary web portion 22 includes fastener openings 24. The web portion further includes at least one access opening 26.

It should be understood that for purposes hereof annular refers to a ring shape. The annular ring shape may be circular or may be other closed shapes. Also as used herein, substantially or generally circular refers to perfectly circular shapes as well as other closed shapes, such as for example, oval shapes, ellipse shapes, polygons or other types of closed shapes. It will be appreciated that exemplary tie downs may be made in stylized configurations with shapes and/or light configurations that correspond to stylized designs or trademarks of vehicle manufacturers or other entities who may supply the tie downs or install them on the vehicles that the entity manufactures or utilizes.

The exemplary base 16 further includes a light ring 28. The exemplary light ring 28 is comprised of translucent material. The exemplary light ring 28 serves as a light diffuser and overlies a plurality of lights 30 (see FIG. 15)

which function in a manner later discussed. The exemplary light ring 28 extends in surrounding relation of the base opening 18. For purposes hereof a light ring will be construed as a structure which directs or diffuses the light from one or more light sources in or adjacent to the light ring so that the vicinity of the tie down is illuminated.

The exemplary tie down 10 further includes a generally circular centerpiece 32. Centerpiece 32 includes a generally circular recess 34 with a flat central portion. An eye 36 is rotatably movably mounted in operative connection with the centerpiece 32. In the exemplary embodiment the eye is substantially continuous, triangular in overall shape and generally circular in transverse cross-section. The exemplary eye 36 includes an opening 38 that is bounded by the eye.

In the exemplary arrangement the eye 36 is movably connected to the centerpiece 32 through a yoke 40. The exemplary yoke includes a central portion 42 and tab portions 44 that extend on opposed sides of the central portion. Each tab portion includes an opening (not separately shown) through which a shaft portion of respective threaded fastener 46 extends. Each fastener 46 includes an enlarged head 48. A head of each respective fastener engages a respective tab portion 44, and in the operative position of the tie down 10 holds the yoke 40 in abutting connection with the flat portion of the centerpiece 32.

In the exemplary arrangement the eye includes a straight section 50 that extends through and is movable rotatably within the central portion 42 of the yoke 40. The straight section 50 has an end portion 52 at each end thereof outside the central portion of the yoke. The eye further includes a curved section 54 that extends between and connects to each end portion. In the exemplary arrangement the curved section 54 includes a rounded point 56.

Figure 17:
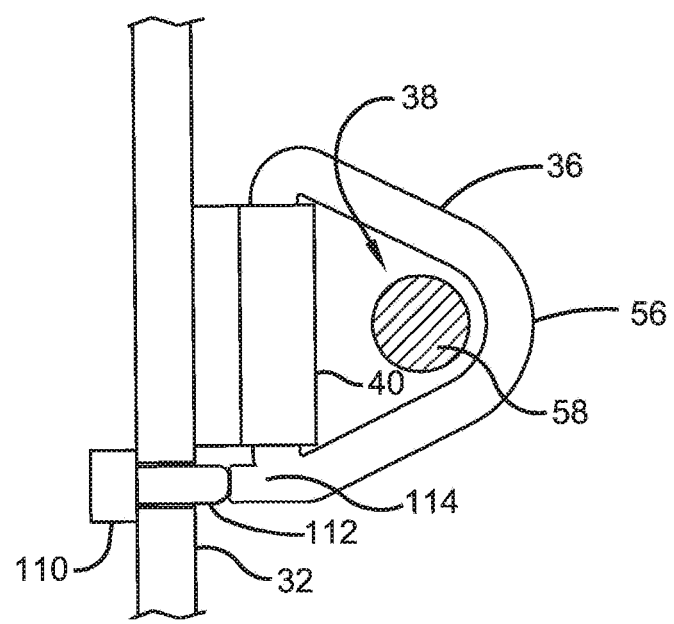
FIG. 17 is a view similar to FIG. 16 with the eye in an extended position.

In the exemplary arrangement the eye 36 is rotatable in operative supported connection with the centerpiece while being held in engagement with the centerpiece by the yoke 40. The exemplary eye is movable to a retracted position shown in FIG. 2 in which the eye extends in substantially parallel abutting relation with the surface of the flat portion of the centerpiece in the recess 34. In the retracted position the eye nests in the recess 34 so as to be compact and unlikely to inadvertently engage any items adjacent thereto. The exemplary eye 36 is manually movable from the retracted position to an extended position such as shown in FIG. 17. In the extended position of the eye the point 56 is directed transversely away from the centerpiece 32 and the opening in the eye 38 is enabled to engage a connecting member 58. In exemplary arrangements the connecting member may include a member that is releasably engageable in a tensioned relationship with the eye. Such connecting members may include for example, a rope, a chord, a wire, a chain, a hook or other suitable member for engaging the eye. Of course it should be understood that these arrangements are exemplary In the exemplary arrangement the eye is configured so that the material which comprises the eye extends substantially continuously on all sides of the opening, including the area of the eye that extends through the yoke. In other arrangements the eye may have one or possibly more gaps in the continuity of the material that bounds the opening. For example, in some example arrangements the material which comprises the eye may have a gap in the continuity of the material in the straight section that extends within the yoke. However, in other example arrangements there may be gaps in continuity in other areas of the eye. For purposes hereof the eye is referred to as being substantially continuous if it has gaps in continuity that are sufficiently small in width or that are otherwise configured or positioned so that connecting members that are engaged in the opening of the eye cannot move out of the opening and out of engagement with the eye through the gap or gaps. Further, it should be understood that while an eye with a substantially overall triangular shape is used in an exemplary embodiment, eyes having other shapes may be used in other example embodiments. Eye shapes may be varied based on the type and/or number of connecting members to be engaged with the eye as well as for aesthetic purposes.

The exemplary centerpiece 32 further includes an outer peripheral portion 60. In the exemplary embodiment the outer peripheral portion includes a substantially continuous annular surface that bounds the outer periphery of the substantially circular centerpiece. The outer peripheral portion is configured to engage the annular base recess 20 of the base 16. In the exemplary arrangement the light ring 28 is positioned radially outward from the centerpiece and in surrounding relation thereof. The exemplary base 16 further includes an annular peripheral lip 62 which extends radially outward from and in surrounding relation of the light ring 28. Of course this configuration is exemplary and in other embodiments other arrangements may be used.

As shown in FIG. 3 in the exemplary arrangement the fasteners 46 extend through the fastener openings 24 in the web portion 22 of the base and also through wall openings 64 that extend through the supporting structure 12. In the exemplary arrangement the supporting structure 12 comprises a wall 66 which includes a first side 68 against which the base 16 is positioned. The wall 66 further includes a second opposed side 70. In an exemplary arrangement the wall 66 is a wall bounding a toolbox that is configured for use within the bed of a pickup truck or similar vehicle. However the exemplary embodiments of the tie downs described herein may also be used in connection with others types of support structures including walls, floors, ceilings, frames, decks, dividers, beams or other structures to which the tie down may be connected.

The exemplary tie down 10 further includes a backing plate 72. The exemplary backing plate includes a pair of plate openings 74. The plate openings are configured to be aligned with the web openings 24 and the wall openings 64 such that the threaded shaft portions of fasteners 46 may extend therethrough. Locking nuts 76 releasably engage the threaded ends of the shaft portion of fasteners 46 that extend through the backing plate 72.

In the exemplary arrangement the backing plate 72 is configured to engage the second side 70 of wall 66. The exemplary arrangement provides for the base 16, centerpiece 32 and the backing plate to be operatively engaged with the wall 66 in fixed operative connection by tightening the locking nuts. In the exemplary arrangement the fasteners 46 which are directly engaged with the tab portions 44 of the yoke 40 provide a firm holding force through the fastener heads 48 to the yoke and the eye 36. Of course it should be understood that this arrangement is exemplary and in other embodiments other approaches may be used.

For example in some alternative arrangements the base may include additional features or structures to facilitate mounting and/or provide support for the tie down. For example FIGS. 8 through 11 show an arrangement in which the previously described annular base 16 may be positioned in overlying relation of a support plate 78. The exemplary support plate 78 includes openings that are aligned with the fastener openings 24 and access opening 26 in the base 16. The exemplary support plate 78 may be configured to provide annular support for the base 16. The support plate 78 may be positioned and held in sandwiched overlying relation between the first side of the wall to which the tie down is mounted and the base 16.

Further in exemplary arrangements the exemplary support plate 78 may be used to cause the base and connected tie down components to extend further outwardly from the wall or other supporting structure on which the tie down is mounted compared to an arrangement in which the support plate is not used. Further in exemplary arrangements the support plate 78 may provide a housing for circuitry, lights or other structures associated with the tie down.

FIG. 12 shows an exploded view of an arrangement for mounting the tie down which further includes an intermediate plate 80. The intermediate plate 80 is configured to be positioned between the support plate 78 and the base 16. The intermediate plate 80 may be used to further extend the base outward from the wall or other support structure. The intermediate plate may also be used as a bezel to provide a surrounding structure for the base so as to protect the side wall thereof from damage due to impacts as well as to prevent rain or snow from entering the area between the base 16 and the supporting surface. Of course it should be understood that these arrangements are exemplary and other embodiments other approaches may be used.

Figure 15:
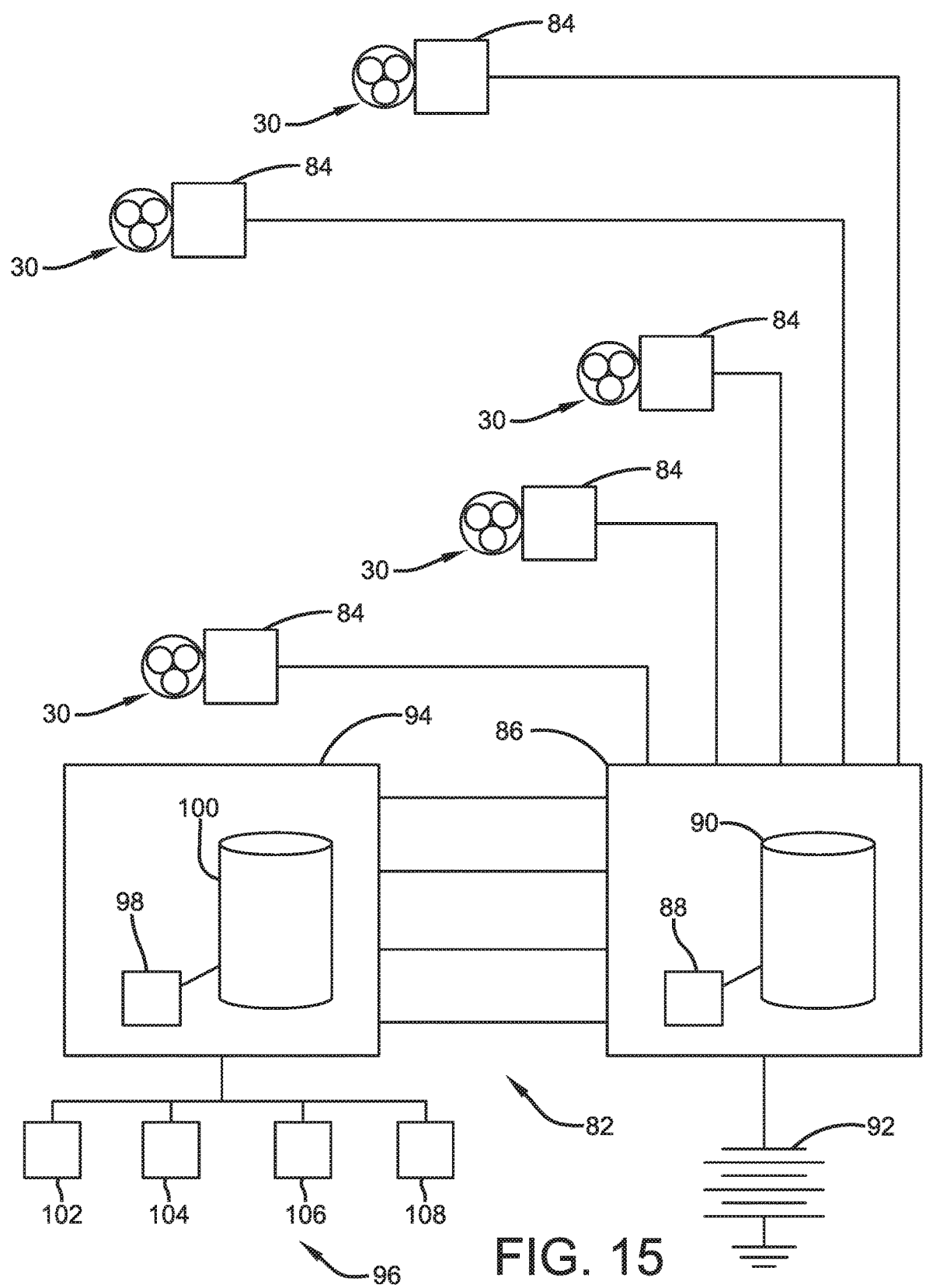
FIG. 15 is a schematic view of an exemplary light arrangement and control circuitry.

FIG. 15 shows the lights 30 that are used in an exemplary embodiment to selectively illuminate the light ring 28, and associated control circuitry generally indicated 82. In the exemplary arrangement the lights 30 comprise light emitting diodes (LEDs). The LEDs are arranged in a circular pattern that underlies the light ring and causes the lights 32 to selectively surroundingly illuminate the centerpiece 32 and the eye 36 as well as the vicinity of the tie down. In the exemplary arrangement each of the lights comprise (Red, Green, Blue) (RGB) LEDs that are usable to selectively produce a plurality of output colors of visible light based on the level of illumination of each LED. This enables the exemplary arrangement to output selectively any of a plurality of colors at selectively varied illumination intensities. Of course it should be understood that these lights are exemplary and in other embodiments other types and numbers of lights may be used.

In the exemplary arrangement each light 30 is associated with a respective microcontroller 84. Each microcontroller includes a processor and programmed instructions which enable selectively illuminating each light responsive to signals from a master light controller 86. The master light controller 86 includes a processor 88 and a data store 90. The data store includes processor executable instructions that are operative to cause signals to be sent to the microcontrollers 84 so as to control the on or off condition of each of the lights 30 as well as the output color and illumination intensity level thereof. The master light controller 86 is in operative connection with one or more power sources schematically indicated 92. In some exemplary embodiments the power source 92 may be the electrical system of the vehicle or other apparatus to which the tie down is mounted. However in other embodiments the power source may include a separate battery or a connection to a household current source for example.

The master light controller 86 is in operative connection with an interface controller 94. Interface controller 94 is in operative connection with a plurality of devices 96 that are utilized in connection with operation of the lights 30 and the master light controller 86. The exemplary interface controller 94 includes at least one processor 98 that is in operative connection with at least one data store 100. The data store includes processor executable instructions which are operative to cause various actions to be taken by the devices 96 and/or the master light controller 86. It should be understood that while in this exemplary embodiment a separate master light controller, interface controller and microcontrollers are used, in other embodiments such controller functions may be combined in a single unit or distributed among a plurality of units.

In an exemplary arrangement the devices 96 may include one or more switches 102. The exemplary switches 102 can in various embodiments be manually actuated switches or other types of switches which are operative to send at least one signal which is operative to change one or more of the lights between illuminated (e.g. on) and not illuminated (e.g. off) conditions. For example, in some arrangements switches 102 may include a pushbutton switch, a foot actuated switch, a motion sensing switch, a limit switch or other type of switch element. Responsive to the condition of the switch 102 the interface controller 94 is operative to communicate with the master light controller 86 which causes each of the lights to selectively be in either an illuminated or not illuminated condition. Of course these approaches are exemplary.

In the exemplary arrangement an input device 104 is utilized to provide inputs that control the level of intensity of the illumination output by one or more of the lights. In exemplary arrangements the input device 104 may comprise one or more pushbuttons, knobs, slide switches or other manual input devices which are usable to provide inputs that correspond to a desired level of illumination. In other exemplary arrangements the input devices may be an interface to an electrical device such as an output signal from an ambient light sensor or other signal source, responsive to which output signal the intensity of the lights is controlled. In the exemplary arrangement inputs to such input devices are operative to cause interface controller 94 to operate in accordance with its programmed constructions to cause the master light controller 86 to change the signals sent to the microcontrollers 84 of the lights so as to selectively change the output illumination intensity of the lights while the lights remain continuously illuminated.

In exemplary arrangements one or more input devices 106 are operative to receive inputs indicative of the color to be output from the lights. In exemplary arrangements input device 106 may include switches of various types, a touchscreen or other suitable devices through which an input indication of desired color or a series of colors to be output can be received. In some arrangements input devices 106 may be operative to receive manual inputs while in other arrangements the input devices may receive electrical signals from another device that is utilized to provide an indication of desired colors. For example in some arrangements input device 106 may include an interface to a sound system associated with the vehicle so as to cause changes in lighting color and/or intensity to occur with changes in musical outputs being provided by the sound system. In other embodiments an operator of a vehicle may provide inputs so as to cause the lights 32 provide output colors that are coordinated with or that otherwise complement the appearance of the vehicle. Inputs through one or more input devices 106 are operative to cause the interface controller 94 to cause signals to be sent to the master light controller 86 and to control the output color and/or intensity from one or more of the lights in response thereto. Of course it should be understood that various light conditions may also be provided from the lights so as to provide different colors and/or intensities from each of the lights or to cycle the on and off conditions or colors of the lights to simulate motion, strobe or other effects depending on the inputs and the programming associated with the controllers.

An exemplary arrangement further includes a wireless interface 108. In the exemplary embodiment the wireless interface is operative to provide radio frequency (RF) communication with one or more remote devices. Such remote devices may include a wireless device such as a user's smart phone, iPad® or other mobile device. Such RF communications may be via local communications such as near field communication (NFC) or BlueTooth™ or via wide area communications such as through a WiFi connection. In exemplary embodiments the interface 108 may be operative to receive communications from an authorized user's remote device so as to cause the operation of the lights and to control features such as the output color, output illumination intensity, illumination patterns or other aspects of the output illumination from the lights.

For example in some exemplary arrangements a portable device may be programmed to enable a user, by providing one or more inputs to the remote device, to illuminate the lights in a particular manner so as to facilitate locating the vehicle. In other arrangements the user may remotely cause operation the lights so as to facilitate a user entering the area of the cargo bed of the vehicle or to assist in positioning and loading materials into a cargo bed in proximity to the illuminated tie down. Alternatively or in addition the user interface of a mobile device may be operated to selectively cause illumination of the area in proximity to the tie down and the eye thereof for purposes of checking the status of a connecting member in engagement with the eye or the status of the load or other item that may be in connection therewith. Various approaches for controlling the lights of the exemplary tie down may be utilized in different embodiments depending on the programming of the controllers and the desires of the operator.

It should be understood that while in the schematic light control circuitry shown in FIG. 15 a master light controller and interface controller are shown in connection with a light ring of a single tie down, in other arrangements such controllers may be operative to control light rings on a plurality of tie down devices. Further, while in the exemplary arrangement each tie down is shown in connection with a plurality of lights located in a single light ring, other embodiments may include other lighting arrangements. Such lighting arrangements may include multiple light rings, strobe lights, laser lights or other types of lights that can be utilized in connection with the particular tie down arrangement.

Figure 16:
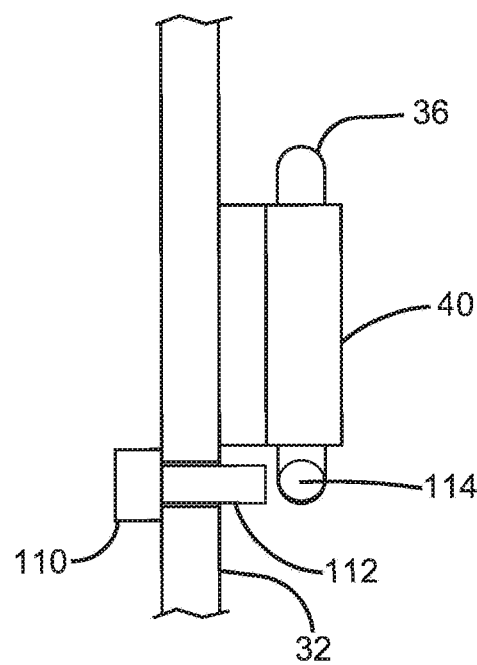
FIG. 16 is a side view of a centerpiece of a tie down with the eye positioned in a retracted position.

In some exemplary arrangements, different switch configurations may be utilized for purposes of providing the signals that are used change the lights 30 between illuminated and not illuminated conditions. For example, as shown in FIGS. 16 and 17 the light ring of a tie down may be configured to illuminate responsive to the position of the eye 36. For example the centerpiece may be in operative connection with a plunger type switch 110 which changes its electrical condition in response to a position of an outwardly biased switch activating button 112 that extends therefrom. Switch 110 corresponds to switch 102 as discussed in connection with the circuitry of FIG. 15.

In the arrangement shown, the eye 36 includes a projection 114 that is attached thereto. In the retracted position of the eye 36 shown in FIG. 16 the projection 114 is disposed away from the button 112. The button extends outwardly from the switch 110 and is in a first electrical condition in the position shown in FIG. 16. In this position of the eye and the switch, the lights associated with the tie down are not illuminated. When the eye 36 is moved to the extended position shown in FIG. 17 the projection 114 engages the button 112 and moves it inwardly relative to the position of the button in FIG. 16. In the exemplary arrangement this change in the position of the button causes a change in electrical condition of the switch 110 which is operative to cause the controllers to illuminate the lights 30. In this exemplary arrangement the lights are illuminated responsive to movement of the eye to the extended position such that the light ring surroundingly illuminates the centerpiece and the eye so as to facilitate the ability of a user to visually position a connecting member 58 to engage the connecting member in the opening 38 of the eye 36.

In some exemplary arrangements the programming associated with the interface controller 94 and/or the master light controller 86 may be operative to cause the lights 30 to remain illuminated for as long as the eye remains in the extended position. Alternatively in other embodiments the programming associated with one or both of the controllers may be operative to cause the illumination to occur on a timed basis after the eye is moved to an extended position. For example the lights may be illuminated for a set programmed time value that is intended to correspond to a time period usually necessary to engage a connecting member 58 with the eye. This programmed time value is stored in at least one data store associated with a controller. Further, in some exemplary arrangements this programmed time value can be changed trough inputs to an interface operatively connected to the controller. Of course these approaches are exemplary and in other embodiments other approaches may be used.

In some exemplary arrangements, moving the eye from the extended position shown in FIG. 17 to the retracted position shown in FIG. 16 may cause the control circuitry to discontinue illumination of the lights 30 in situations where the lights have remained illuminated during the period when the eye is in the extended position. Alternatively in other arrangements the one or more controllers may operate when the illumination has been discontinued with the eye in the extended position, to cause a further set period of illumination to occur when the eye is moved from the extended position shown in FIG. 17 to the retracted position shown in FIG. 16. This further set period of illumination may correspond to a further stored time value that is stored in at least one data store. Such a time value may also be programmably changeable in some embodiments. Of course it should be understood that these approaches are exemplary.

Figure 13:
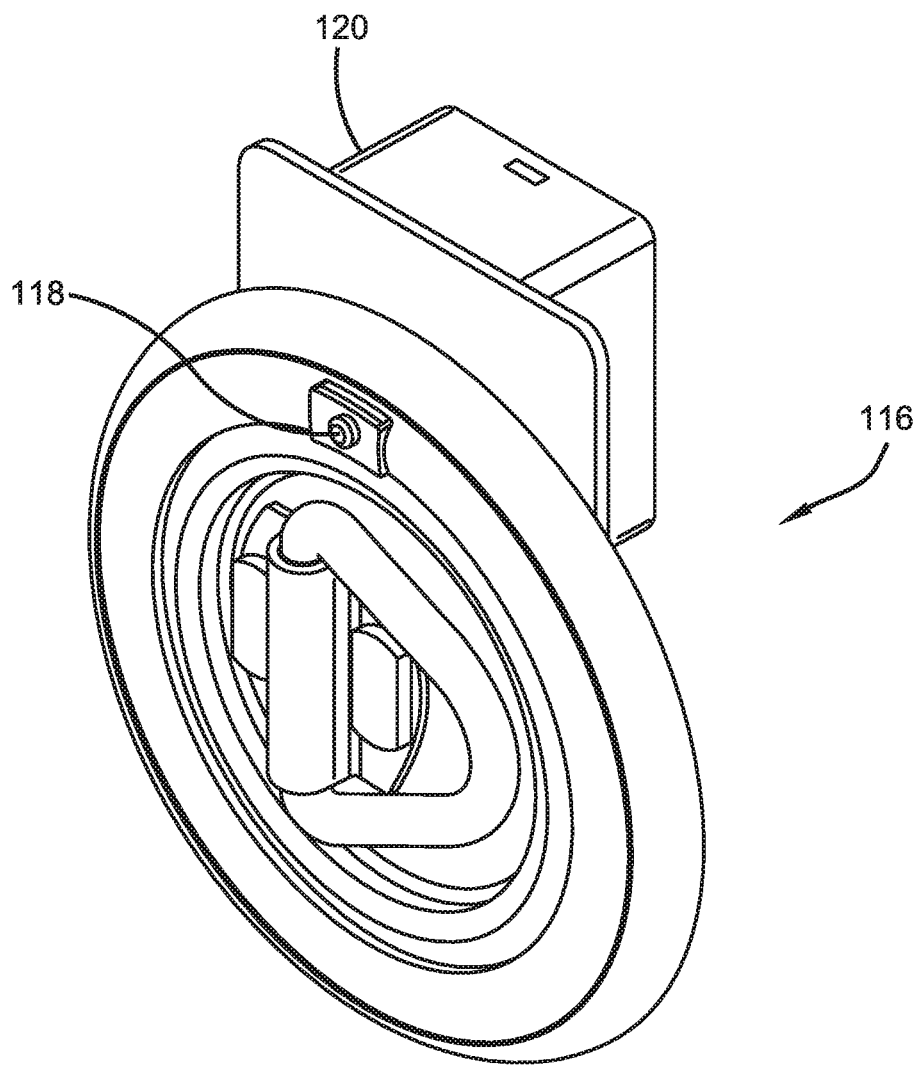
FIG. 13 is a front perspective view of an alternative tie down.

FIG. 13 shows an alternative embodiment of a tie down 116. Tie down 116 has features that are generally similar to tie down 10. However, tie down 116 includes a manually actuated pushbutton switch 118 on the exterior thereof. Tie down 116 further includes an enclosure 120 which is mounted in connection with a backing plate or similar structure. Enclosure 120 may be utilized for purposes of enclosing the circuitry or other devices associated with the unit.

In the exemplary arrangement switch 118 may be manually actuated to cause the lights of the tie down to illuminate. With the lights illuminated, manually actuating the switch 118 will cause the lights to cease to illuminate. As can be appreciated this exemplary arrangement enables a user to manually control the illuminated condition of the lights which may facilitate activities in proximity to the tie down when used in certain environments.

Figure 14:
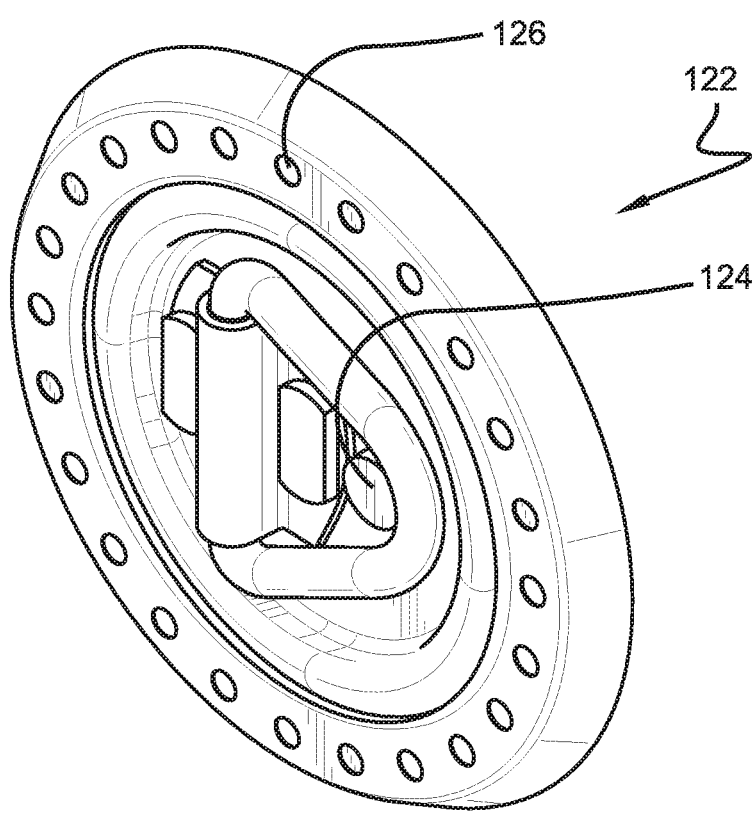
FIG. 14 is a front perspective view of a further alternative tie down.

FIG. 14 shows a further alternative embodiment of a tie down 122. This embodiment also includes a manually actuated pushbutton switch 124. In this arrangement the pushbutton switch is positioned on the centerpiece of the unit in proximity to the eye. This arrangement may facilitate the ability of the user to actuate the pushbutton switch when manipulating the eye or a connecting member to be engaged therewith. Tie down 122 further includes a light ring 126. The exemplary light ring 126 comprises a plurality of discrete light emitting units included in an annular arrangement without an overlying diffuser. An arrangement of this type may be suitable for providing high illumination over a larger area. Such greater illumination intensity may be useful in some environments such as in illuminating an interior area of a trailer or other structure in which the tie down may be used. Other example appearance configurations for tie downs which may include some of the features discussed herein, are shown in U.S. patent application Ser. No. 29/642,066 filed Mar. 27, 2018 which is incorporated herein by reference in its entirety.

Exemplary embodiments may further include features that are useful in connection with sensing and monitoring tie down conditions. FIG. 18 shows an exemplary arrangement which includes a tie down 128. Tie down 128 is substantially similar to tie down 10 previously described, but includes at least one sensor 130. The sensor 130 is in operative connection with the central portion of the yoke which is in engagement with eye 132. The at least one sensor which may be an electrical resistance, piezoelectric or other type of strain or pressure sensor is operative to detect a force which corresponds to the tension force which acts on the eye 132 as a result of a connecting member or other item being in connection therewith.

The at least one sensor 130 is in operative connection with circuitry 134 which includes at least one controller 136. The controller 136 includes a processor and a data store which operate to analyze signals received from the at least one sensor and provide outputs responsive to the detection of certain tension conditions. In the exemplary embodiment the controller 136 is in operative connection with devices 138. In the exemplary embodiment the devices include a wireless transmitter 140 which is operative to communicate RF or other wireless signals to a remote device, such as wireless mobile device 142. Other devices 138 include an interface 144. Interface 144 is operative to communicate with the interface controller 94 of the light control circuitry 82 or other circuitry that is operative to control the lights associated with the tie down 128. An audio annunciator 146 is also in operative connection with the exemplary controller 136. It should be understood that while in this embodiment a separate controller 136 is used in connection with the at least one sensor, in other embodiments the functions of the controller 136 may be combined with one or more of the light controllers.

In an exemplary arrangement the tie down 128 and the associated circuitry 134 are operative to monitor the tension force level that is acting on the eye 132. For example in some exemplary arrangements the controller may operate responsive to detecting a decrease in the level of tension force acting on the eye which decrease is more than a threshold amount, to make a determination that the change in the level of tension may correspond to a connecting member breaking or otherwise effectively disengaging from the eye. In some arrangements the determination may be made based on a threshold decrease in tension force occurring within a set period of time. This in some arrangements may be a short period of time that would correspond to a cord going slack or breaking loose from the eye, for example. In response to detecting such a condition through operation of the exemplary controller 136, the controller is operative to cause the wireless transmitter 140 to communicate at least one wireless message indicative of the condition to the mobile device 142. The device 142 may operate in accordance with its programming to provide an output through a screen or other output device thereon to alert the operator of the device that a change has occurred in connection with the tie down which may represent that a load or other connected item is no longer engaged.

Further in exemplary embodiments the controller 136 may operate responsive to the determination to provide one or more signals through the interface 144 to the light controller. Such signals through the interface 144 may operate to cause the lights associated with the affected tie down to illuminate, to identify the tie down and to facilitate the visual inspection thereof by an operator. Further in some exemplary arrangements the determination related to the decrease in the tension force level may cause the controller 136 to operate the audio annunciator 146 to provide one or more audible outputs. The audible outputs may alert an operator of the possible problem condition. Of course these approaches are exemplary and other embodiments other types of devices interfaces, outputs or alerting features may be utilized.

In other arrangements the controller 136 may operate in accordance with its programming to provide the transmission of one or more wireless signals responsive to an increase in the sensed tension level. As can be appreciated under certain loading conditions the tension level acting on the eye of the tie down may substantially increase above a threshold amount, or alternatively change more than a certain amount within a defined time period. Such a change may correspond to the shifting of a load or other condition which causes a substantial increase in the tension level that is acting on the eye. In such conditions the controller operates in accordance with associated programming to make a determination of a potentially adverse condition responsive to the increase in the tension level. Responsive to the determination, the controller 136 operates to cause the wireless transmitter 140 to transmit at least one signal indicative of the change in tension condition to the remote device. Alternatively or in addition, the controller 136 may operate in accordance with its programming to cause the interface 144 to provide signals to the light control circuitry to cause illumination of the lights associated with the affected tie down. The audible annunciator 146 may also be caused to operate in response to such determination. Of course it should be understood that this configuration, arrangement and method of operation is exemplary.

In still other exemplary arrangements the circuitry 134 may be configured to work as a switching arrangement so as to control the lights associated with the tie down in lieu of a manually actuated pushbutton switch or a switch that causes illumination of the lights in response to movement of the eye. For example, in some arrangements the controller 136 may be operative to detect a condition which corresponds to an increase in tension level force acting on the eye to cause a signal through the interface to the light control circuitry that causes the lights of the tie down to illuminate. This may correspond for example to a user pulling on the eye so as to provide a detectable change in the tension level signal from the tension sensor which serves as an indication that the user desires the lights to illuminate. In such an arrangement the need for a separate switching device for initiating light illumination may be eliminated. Further in other exemplary arrangements a tension sensing arrangement for causing the lights to illuminate may be used in conjunction with a manually actuated or other type switch. Such a switch may be utilized to turn off the lights after they have been illuminated in response to a change in tension level. Alternatively or in addition such a switch may be utilized to turn on the lights in the event that the user does not wish to turn on the lights by applying a tension level on the eye. Of course these approaches are exemplary and in other embodiments other approaches may be used.

In still other embodiments tension signals from the at least one sensor may be utilized to provide outputs that are indicative of the tension level force that is acting on the eye of the tie down. For example in some arrangements the controller 136 may be in operative connection with at least one data store which includes programmed data and instructions which correspond to a threshold value that corresponds to a maximum safe tension level (or optimum or standard tension level) that may be exerted on the eye. When this programmed threshold value is reached or exceeded the controller may operate to cause indications thereof to be provided. Such indications may include the transmission of wireless signals to a remote device such as the mobile device. It may also include causing illumination of the lights and/or providing audible outputs responsive at least in part to the tension level being at or above the threshold value.

In still other example arrangements the controller 136 may operate in accordance with its circuit executable program instructions to cause the color output by the lights or other aspects of the illumination of lights on the tie down to change responsive to changes in the tension level. For example, the controller may operate to cause the intensity and/or the color of the illumination output from the lights of a tie down to vary with the sensed tension level applied to the eye thereof. This may enable the user to determine if the tension force on each of the tie downs is within acceptable limits. Alternatively or in addition such a feature may be utilized so that the user can balance the force so that the tension on each of a plurality of tie downs is generally comparable. This may be done for example by the user comparing the color and/or intensity output from the lights of each tie down as each vary with the tension level, so that the output colors from the tie downs are generally the same to indicate about the same tension level, for example.

In other exemplary arrangements the controller 136 may be in operative connection with a transceiver or other interface that is operative to receive wireless signals from a remote device such as mobile device 142. The circuit executable program instructions associated with the controller may operate to cause the controller to determine the tension level detected as acting on the eye of a tie down, and to cause the lights thereof to illuminate with a color and/or an intensity corresponding to the sensed tension level. The controller may cause the illumination condition to be present for a set programmed time period after receipt of the mobile device signal. In this way an operator may check the tension on each of a plurality of tie downs by visual observation. Such a feature may be useful when the tie downs are utilized to hold a load in connection with a vehicle, which load may shift or otherwise vary the tension force acting on the tie downs during the course of vehicle movement. The exemplary arrangement may enable an operator to check the tension levels on the tie downs periodically to assure that the tensions remain within desired levels. Alternatively or in addition, in exemplary arrangements the circuitry of at least one controller 136 may be operative to communicate with the mobile wireless device 146 or other user interface through messages which include data corresponding to the sensed tension levels on each of the tie downs. The mobile wireless device or other user interface may be operative to selectively output the data corresponding to the sensed tension levels on each of the tie downs so that the operator by reviewing outputs from output devices of the device or other interface, may be advised of conditions that correspond to the level of tension, changes in tension levels and/or excessive tension levels acting at the various tie down. Of course these approaches are exemplary in other embodiments other approaches may be used.

Thus the exemplary embodiments described herein provide improved capabilities and eliminate difficulties encountered in the use of prior devices and systems, and obtain useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the new and useful features are not limited to the exact features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

We claim:
1. Apparatus comprising:
   a tie down including
   an annular base,
      wherein the base includes a light ring,
         wherein the base includes at least one light that is operative to selectively illuminate the light ring,
      wherein the base includes a centered generally circular base opening,
   a generally circular centerpiece,
      wherein the centerpiece extends in the base opening,
   an eye, wherein the eye includes an opening therethrough,
      wherein the eye is rotatably mounted in operative connection with the centerpiece,
      wherein the eye is angularly movable between
         an extended position in which the eye extends transversely outward from the centerpiece, and
         a retracted position in which the eye extends in generally parallel relation with the centerpiece,
      wherein the at least one light is operative to surroundingly illuminate the centerpiece and the eye.
2. The apparatus according to claim 1
   wherein the centerpiece is radially outwardly bounded by an outer peripheral portion,
   wherein the outer peripheral portion is in operative engagement with the base.
3. The apparatus according to claim 2
   wherein the outer peripheral portion includes a substantially continuous annular peripheral surface that engages the base along its entire length.

4. The apparatus according to claim 3
wherein the base includes an annular base recess,
wherein the annular base recess extends in surrounding relation of the generally circular base opening,
wherein the outer peripheral portion extends in the annular base recess.

5. The apparatus according to claim 2
and further including
a backing plate,
at least one fastener,
wherein the base is configured to extend on a side of a wall, and the backing plate is configured to extend on an opposed side of the wall from the base,
wherein the at least one fastener operatively engages the base, the centerpiece and the backing plate and is configured to hold the tie down in fixed operative connection with the wall.

6. The apparatus according to claim 5
and further including a yoke,
wherein the yoke is in fixed operative connection with the centerpiece,
wherein the eye extends through the yoke and is rotatable therein.

7. The apparatus according to claim 6
wherein the yoke includes
a central portion, wherein the eye extends through and is rotatable within the central portion,
a pair of tab portions, wherein each tab portion extends on an opposed side of the central portion from the other tab portion,
wherein each tab portion includes a fastener accepting opening, wherein the fastener accepting opening extends through the tab portion,
wherein each respective fastener extends through a respective fastener accepting opening and operatively engages the backing plate.

8. The apparatus according to claim 7
wherein the eye is substantially continuous and generally circular in transverse cross-section,
wherein the eye includes a straight section,
wherein the straight section extends through the central portion of the yoke and is rotatable therein.

9. The apparatus according to claim 8
wherein the straight section of the eye has opposed end portions,
and wherein a curved section of the eye extends between and connects to each of the end portions and bounds the opening through the eye, wherein the opening is configured to have a connecting member extend in the opening.

10. The apparatus according to claim 8
wherein the eye is substantially triangular in shape, and wherein the eye includes a point,
wherein in the extended position of the eye, the point is pointed away from the centerpiece.

11. The apparatus according to claim 8
wherein the base includes a web portion,
wherein the web portion extends in the generally circular base opening,
wherein the web portion includes web fastener openings,
wherein respective fasteners extend through the web fastener openings.

12. The apparatus according to claim 8
wherein the tie down further includes a switch,
wherein the switch is selectively operative to cause the at least one light to be in an on condition or an off condition.

13. The apparatus according to claim 12
wherein the switch is in operative connection with the eye, wherein the at least one light is in at least one of the on condition or the off condition responsive at least in part to a rotational position of the eye.

14. The apparatus according to claim 12
wherein the switch comprises a manually actuatable pushbutton switch.

15. The apparatus according to claim 12
wherein the at least one light is selectively operative to output light of a plurality of different colors, and wherein the output light color is selectively changeable.

16. The apparatus according to claim 15
wherein an illumination intensity level of the at least one light is selectively changeable while the light continuously remains illuminated.

17. The apparatus according to claim 16
and further comprising
at least one sensor, wherein the at least one sensor is in operative connection with the eye,
wherein the at least one sensor is operative to sense a tension force level acting on the eye.

18. The apparatus according to claim 17
and further including
a wireless transmitter, wherein the wireless transmitter is in operative connection with the at least one sensor,
wherein the wireless transmitter is operative to transmit at least one signal responsive at least in part to at least one of a decrease or an increase in the tension force level acting on the eye.

19. The apparatus according to claim 1
and further comprising
a switch, wherein the switch is in operative connection with the eye and the at least one light,
wherein the switch is operative to cause the at least one light to be in an on condition or an off condition responsive at least in part to an angular position of the eye relative to the centerpiece.

20. The apparatus according to claim 1
wherein the at least one light is operative to output a plurality of different colors, and
wherein the color output from the at least one light is selectively changeable.

21. The apparatus according to claim 1
wherein the illumination intensity level of the at least one light while continuously illuminated, is selectively changeable.

22. The apparatus according to claim 1
and further including
at least one sensor in operative connection with the eye,
wherein the at least one sensor is operative to sense a tension force level acting on the eye.

23. The apparatus according to claim 1
and further including
at least one sensor in operative connection with the eye,
wherein the at least one sensor is operative to sense a tension force level acting on the eye,
a wireless transmitter,
wherein the wireless transmitter is in operative connection with the at least one sensor,
wherein the wireless transmitter is operative to send a signal responsive at least in part to at least one of an increase or a decrease in tension force acting on the eye.

24. Apparatus comprising:
a base,
a light ring,
at least one light, wherein the at least one light is selectively operative to illuminate the light ring,
a centerpiece,
   wherein the centerpiece is in operative connection with the base, and wherein the light ring extends in surrounding relation of the centerpiece,
an eye,
   wherein the eye bounds an opening and is rotatably mounted in operative connection with the centerpiece,
   wherein the eye is angularly movable relative to the centerpiece and is enabled to extend outwardly from the centerpiece to enable a connecting member to extend in the opening of the eye,
   wherein the at least one light is operative to surroundingly illuminate the eye.

25. The apparatus according to claim 24
and further including
a yoke,
   wherein the yoke is in operative connection with the centerpiece,
   wherein the eye is rotatably movable in engagement with the yoke,
a plurality of fasteners,
   wherein a respective fastener extends through the yoke and the centerpiece on opposed sides of the eye.

26. The apparatus according to claim 25
wherein the base and the centerpiece are configured to extend on a first side of a wall, and further including
a backing plate, wherein the backing plate is configured to extend on a second side of the wall opposed of the first side,
and wherein each of the fasteners that extend through the yoke are configured to extend through the wall and operatively engage the backing plate,
wherein the fasteners are operative to hold the base, the yoke and the backing plate in operatively fixed connection with the wall.

27. The apparatus according to claim 25
wherein the base comprises a generally circular base,
wherein the centerpiece is generally circular and includes an annular outer peripheral portion, wherein the annular outer peripheral portion is in engagement with the base.

28. The apparatus according to claim 24
and further comprising
   at least one sensor, wherein the at least one sensor is operative to sense a tension force level acting on the eye,
wherein the at least one light is operative to output light in a plurality of different colors and at a plurality of different light intensities,
and wherein at least one of the color and the light intensity output from the at least one light are selectively changeable responsive to the sensed tension force level.

* * * * *